United States Patent
Morgan

(10) Patent No.: US 12,265,811 B2
(45) Date of Patent: Apr. 1, 2025

(54) SELF-MOVING OPERATING SYSTEM INSTALLATION IN CLOUD-BASED NETWORK

(71) Applicant: Red Hat, Inc., Raleigh, NC (US)

(72) Inventor: Christopher Edwin Morgan, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 117 days.

(21) Appl. No.: 16/946,785

(22) Filed: Jul. 6, 2020

(65) Prior Publication Data

US 2020/0334023 A1    Oct. 22, 2020

Related U.S. Application Data

(60) Division of application No. 14/624,967, filed on Feb. 18, 2015, now Pat. No. 10,705,818, which is a continuation of application No. 13/149,877, filed on May 31, 2011, now Pat. No. 8,984,104.

(51) Int. Cl.
| | |
|---|---|
| *G06F 8/61* | (2018.01) |
| *G06F 9/455* | (2018.01) |
| *G06F 9/48* | (2006.01) |
| *H04L 41/0806* | (2022.01) |
| *H04L 41/0813* | (2022.01) |

(52) U.S. Cl.
CPC ............ *G06F 8/63* (2013.01); *G06F 9/45558* (2013.01); *H04L 41/0806* (2013.01); *H04L 41/0813* (2013.01); *G06F 2009/45562* (2013.01); *G06F 2009/4557* (2013.01); *G06F 9/4856* (2013.01)

(58) Field of Classification Search
CPC ... H04L 41/0806; H04L 41/0813; G06F 8/63; G06F 9/45558; G06F 2009/4557; G06F 2009/45562; G06F 9/4856
See application file for complete search history.

(56) References Cited

U.S. PATENT DOCUMENTS

| | | | |
|---|---|---|---|
| 6,463,457 | B1 | 10/2002 | Armentrout et al. |
| 7,313,796 | B2 | 12/2007 | Hamilton, II et al. |
| 7,439,937 | B2 | 10/2008 | Ben-Shachar et al. |
| 7,529,785 | B1 | 5/2009 | Spertus et al. |
| 7,546,462 | B2 | 6/2009 | Upton |
| 7,596,620 | B1 | 9/2009 | Colton et al. |
| 8,255,529 | B2 | 8/2012 | Ferris et al. |
| 8,364,819 | B2 | 1/2013 | Ferris et al. |

(Continued)

OTHER PUBLICATIONS

"rBuilder and the rPath Appliance Platform", 2007 rPath, Inc., www.rpath.com 3 pages.

(Continued)

*Primary Examiner* — Oussama Roudani
(74) *Attorney, Agent, or Firm* — Dority & Manning, P.A.

(57) ABSTRACT

Embodiments relate to systems and methods for a self-moving operating system installation in cloud-based network. A host cloud in which a guest operating system operates can be identified by a processor. A set of applications in a host cloud can be instantiated, where each of the set of applications is operated using the guest operating system. Information related to an operation of a first application of the set of applications can be received from the host cloud. The processor can update data related to the operation of the guest operating system using the received information.

20 Claims, 7 Drawing Sheets

(56) References Cited

U.S. PATENT DOCUMENTS

| | | |
|---|---|---|
| 8,375,223 B2 | 2/2013 | DeHaan et al. |
| 8,402,139 B2 | 3/2013 | Ferris et al. |
| 8,504,689 B2 | 8/2013 | Ferris et al. |
| 8,595,714 B1 * | 11/2013 | Hamer ................. G06F 9/45558 718/1 |
| 8,606,667 B2 | 12/2013 | Ferris et al. |
| 8,606,897 B2 | 12/2013 | Ferris et al. |
| 8,612,577 B2 | 12/2013 | Ferris et al. |
| 8,612,615 B2 | 12/2013 | Ferris et al. |
| 8,631,099 B2 | 1/2014 | Morgan |
| 8,705,513 B2 * | 4/2014 | Van Der Merwe ..... H04L 47/72 370/392 |
| 8,713,147 B2 | 4/2014 | Ferris et al. |
| 8,782,192 B2 | 7/2014 | Morgan |
| 8,825,791 B2 | 9/2014 | Morgan |
| 8,832,219 B2 | 9/2014 | Morgan |
| 8,880,700 B2 | 11/2014 | Ferris et al. |
| 8,904,005 B2 | 12/2014 | Ferris et al. |
| 8,909,783 B2 | 12/2014 | Ferris et al. |
| 8,909,784 B2 | 12/2014 | Ferris et al. |
| 8,924,539 B2 | 12/2014 | Ferris et al. |
| 8,931,038 B2 * | 1/2015 | Pulier ..................... H04L 67/51 726/1 |
| 8,949,426 B2 | 2/2015 | Morgan |
| 8,954,564 B2 | 2/2015 | Ferris et al. |
| 8,959,173 B1 * | 2/2015 | Robidoux ............. G06F 3/0619 709/215 |
| 8,984,503 B2 * | 3/2015 | Poddar .................. G06F 16/583 717/173 |
| 9,811,532 B2 * | 11/2017 | Parkison ............... G06F 3/0635 |
| 2001/0039497 A1 | 11/2001 | Hubbard |
| 2002/0069276 A1 | 6/2002 | Hino et al. |
| 2002/0165819 A1 | 11/2002 | McKnight et al. |
| 2003/0037258 A1 | 2/2003 | Koren |
| 2003/0061197 A1 | 3/2003 | Hindawi et al. |
| 2003/0110252 A1 | 6/2003 | Yang-Huffman |
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0183799 A1 | 7/2008 | Bobroff et al. |
| 2008/0215796 A1 | 9/2008 | Lam et al. |
| 2008/0240150 A1 | 10/2008 | Dias et al. |
| 2008/0270674 A1 | 10/2008 | Ginzton |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0077551 A1 | 3/2009 | Whiteley |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0115512 A1 | 5/2010 | Sakai |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0269109 A1 * | 10/2010 | Cartales ............... G06F 9/45558 718/1 |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | Dehaan et al. |
| 2010/0306765 A1 | 12/2010 | DeHaan |
| 2010/0306767 A1 | 12/2010 | Dehaan |
| 2011/0016214 A1 | 1/2011 | Jackson |
| 2011/0055034 A1 | 3/2011 | Ferris et al. |
| 2011/0055377 A1 | 3/2011 | Dehaan |
| 2011/0055378 A1 | 3/2011 | Ferris et al. |
| 2011/0055396 A1 | 3/2011 | Dehaan |
| 2011/0055398 A1 * | 3/2011 | Dehaan ................. G06F 9/5077 709/226 |
| 2011/0055588 A1 | 3/2011 | DeHaan |
| 2011/0072431 A1 * | 3/2011 | Cable ..................... G06F 21/10 718/1 |
| 2011/0078303 A1 * | 3/2011 | Li ....................... H04L 67/1031 718/1 |
| 2011/0131134 A1 | 6/2011 | Ferris et al. |
| 2011/0131306 A1 | 6/2011 | Ferris et al. |
| 2011/0131315 A1 | 6/2011 | Ferris et al. |
| 2011/0131316 A1 | 6/2011 | Ferris et al. |
| 2011/0131335 A1 | 6/2011 | Spaltro et al. |
| 2011/0131499 A1 | 6/2011 | Ferris et al. |
| 2011/0142053 A1 | 6/2011 | Van Der Merwe et al. |
| 2011/0161952 A1 | 6/2011 | Poddar et al. |
| 2011/0173302 A1 | 7/2011 | Rider |
| 2011/0213687 A1 | 9/2011 | Ferris et al. |
| 2011/0213691 A1 | 9/2011 | Ferris et al. |

(56) References Cited

U.S. PATENT DOCUMENTS

| | | |
|---|---|---|
| 2011/0213713 A1 | 9/2011 | Ferris et al. |
| 2011/0213719 A1 | 9/2011 | Ferris et al. |
| 2011/0214124 A1 | 9/2011 | Ferris et al. |
| 2011/0231844 A1 | 9/2011 | Ben-Shaul et al. |
| 2011/0231899 A1 | 9/2011 | Pulier et al. |
| 2011/0265081 A1* | 10/2011 | Lucovsky ............. G06F 9/5072 717/177 |
| 2011/0265168 A1* | 10/2011 | Lucovsky ........... H04L 63/0245 709/223 |
| 2011/0271270 A1 | 11/2011 | Bowen |
| 2011/0295727 A1 | 12/2011 | Ferris et al. |
| 2011/0295986 A1 | 12/2011 | Ferris et al. |
| 2011/0296370 A1 | 12/2011 | Ferris et al. |
| 2011/0302312 A1* | 12/2011 | McCrory ................ G06F 9/541 709/226 |
| 2011/0321041 A1* | 12/2011 | Bhat ................... G06F 9/45558 714/21 |
| 2012/0102481 A1* | 4/2012 | Mani ........................ G06F 8/65 717/172 |
| 2012/0110328 A1 | 5/2012 | Pate et al. |
| 2012/0130873 A1 | 5/2012 | Morgan |
| 2012/0131176 A1 | 5/2012 | Ferris et al. |
| 2012/0131594 A1 | 5/2012 | Morgan |
| 2012/0136989 A1 | 5/2012 | Ferris et al. |
| 2012/0137001 A1 | 5/2012 | Ferris et al. |
| 2012/0137002 A1 | 5/2012 | Ferris et al. |
| 2012/0173709 A1* | 7/2012 | Li ........................ G06F 9/5061 709/224 |
| 2012/0173871 A1 | 7/2012 | Ashok et al. |
| 2012/0221454 A1 | 8/2012 | Morgan |
| 2012/0226808 A1 | 9/2012 | Morgan |
| 2012/0304170 A1 | 11/2012 | Morgan |
| 2012/0311154 A1 | 12/2012 | Morgan |
| 2012/0311571 A1 | 12/2012 | Morgan |
| 2014/0006354 A1 | 1/2014 | Parkison et al. |

OTHER PUBLICATIONS

White Paper—"rPath Versus Other Software Appliance Approaches", Mar. 2008, rPath, Inc. www.rpath.com, 9 pages.

White Paper—"Best Practices for Building Virtual Appliances", 2008 rPath, Inc., www.rpath.com, 6 pages.

* cited by examiner

SELF-MOVING OPERATING SYSTEM INSTALLATION IN CLOUD-BASED NETWORK

CROSS-REFERENCE TO RELATED APPLICATION

This application is a divisional of U.S. patent application Ser. No. 14/624,967, filed on Feb. 18, 2015, which is a continuation of U.S. patent application Ser. No. 13/149,877, filed May 31, 2011, each of which is incorporated herein by reference in its entirety.

FIELD

The invention relates generally to systems and methods for a self-moving operating system installation in cloud-based network, and more particularly, to platforms and techniques for configuring a cloud-based operating system with cloud awareness and installation capabilities in order to receive an identification of a new host cloud for installation or migration of the operating system itself, extract the necessary configurations or resources for installation in that target, and move a migrated image of that operating system to the target on an automated basis.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent host clouds to support the user's cloud deployment. That user may further instantiate and use multiple applications or other software or services inside or across multiple of those cloud boundaries, and those resources may be used or consumed by multiple or differing end-user groups in those different cloud networks.

In terms of the installation of a guest operating system in a host cloud or clouds, based upon which a set of virtual machines can be instantiated or supported, in known cloud management platforms and operating systems, the operating system itself is not configured to detect the configuration requirements of a host cloud in which it is to be installed or migrated. One host cloud may for instance require a certain type or category of file systems, or may require or operate based on a particular set of application programming interfaces (APIs). Due to the lack of operating system self-awareness and auto-installation capability, administrators wishing to configure the operating system for particular cloud resources or conditions, may need to manually specify the APIs and/or other resources or configuration data necessary to initially install, copy, and/or move or migrate the operating system in a target host cloud.

It may be desirable to provide systems and methods for a self-moving operating system installation in cloud-based network, in which a guest operating system for a cloud-based implementation can be configured with a kernel that has a native cloud-awareness and installation capability to identify the host cloud in which it is to be installed or operate, and automatically configure the kernel and other resources of the guest operating system to compatibly operate in the intended target cloud or clouds.

DESCRIPTION

Figure 1:
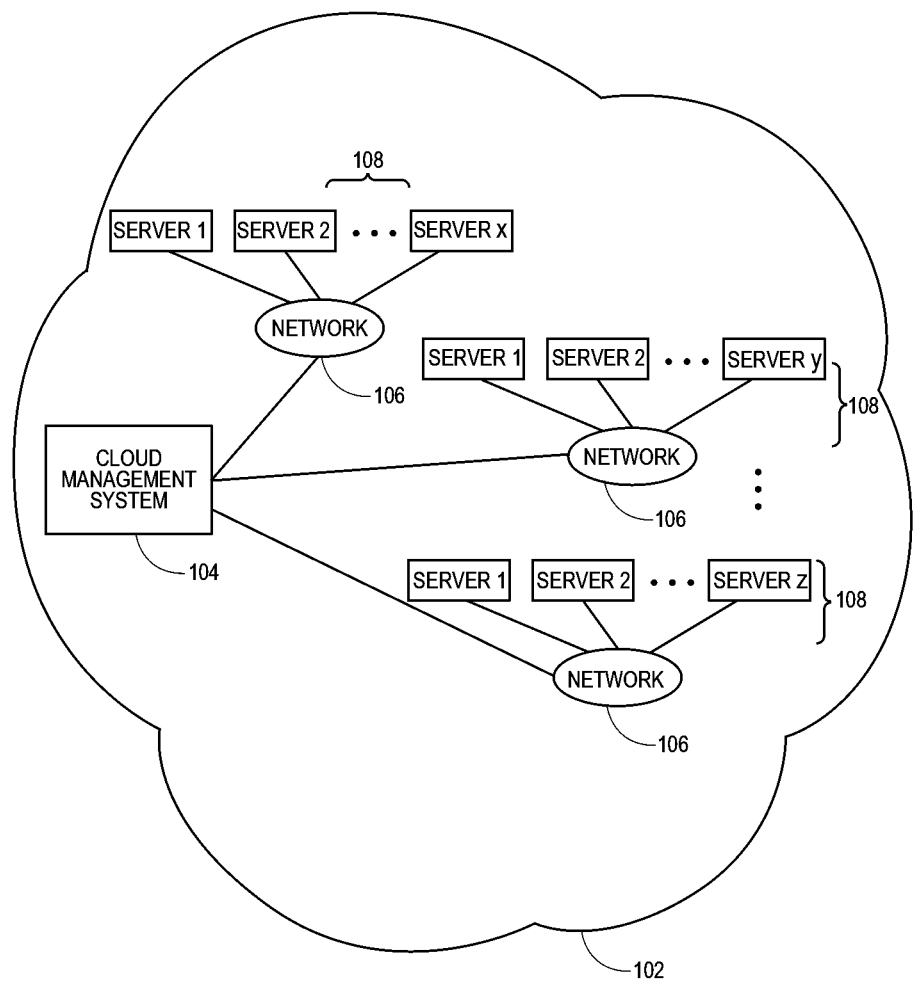
FIG. 1 illustrates an overall cloud system architecture in which various aspects of systems and methods for a self-moving operating system installation in cloud-based network can be implemented, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds. 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
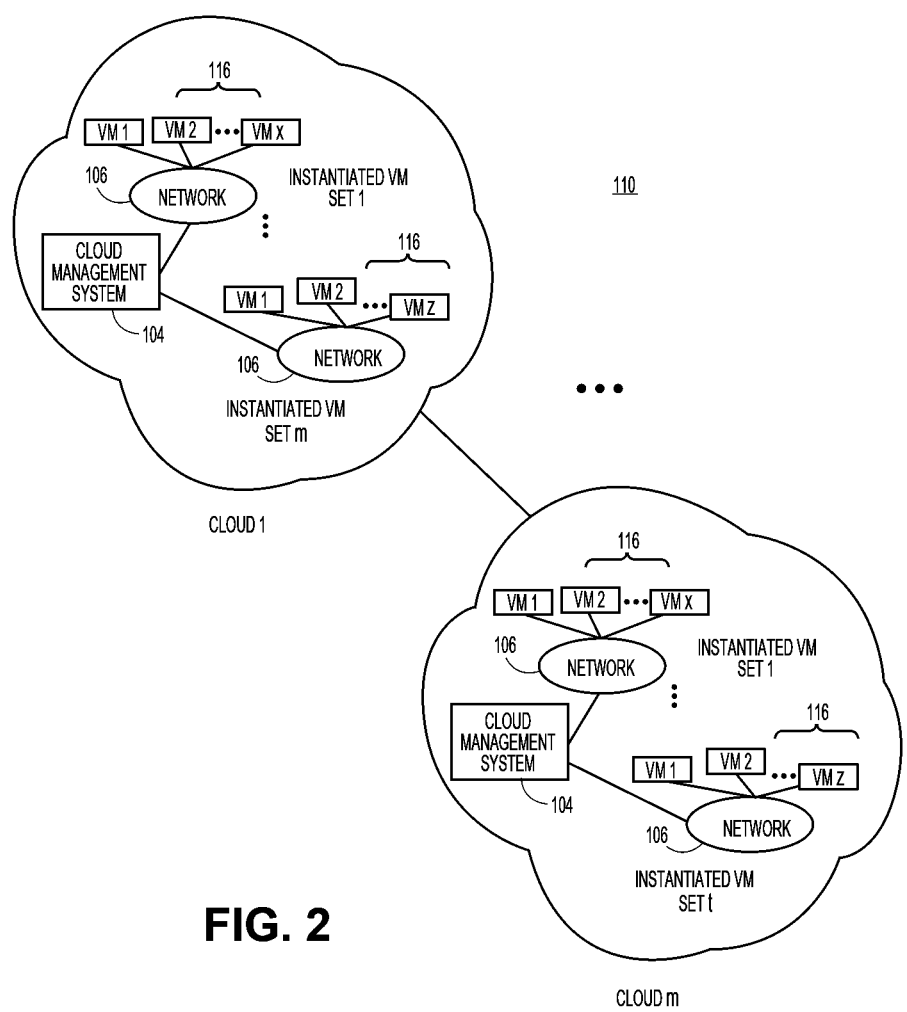
FIG. 2 illustrates an overall cloud system architecture in which various aspects of systems and methods for a self-moving operating system installation in cloud-based network can be implemented, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, North Carolina, or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Aspects of the present teachings relate to platforms and techniques in which the kernel of an operating system acting as a host operating system in a cloud-based network can be equipped or configured with a set of cloud-awareness, and/or auto-installation or auto-migration resources or capabilities. The cloud-aware kernel of the operating system can be configured to contain capabilities and/or services to be able to detect and identify the identity, type, or other information of the cloud in which the operating system is installed, directly at the kernel level and without a need to invoke third-party applications or services located outside of the kernel. The kernel of the host operating system can likewise be configured to contain installation tools and resources to permit the kernel to receive or access an identification of a target cloud environment to which the operating system is to be installed, copied, and/or migrated, and automatically discover and install necessary resources to permit the seamless and/or automatic installation of the operating system to that target cloud or clouds. The host operating system can thereby establish the identity of the cloud in which it is installed and/or to be installed, and for instance automatically configure or adjust operating parameters, services, application programming interfaces, and/or other resources to match the cloud host environment in which it finds itself located or to which it is to be moved. Usage history tracking, including duration or instantiation tracking, can be invoked in existing or target cloud hosts.

Figure 3:
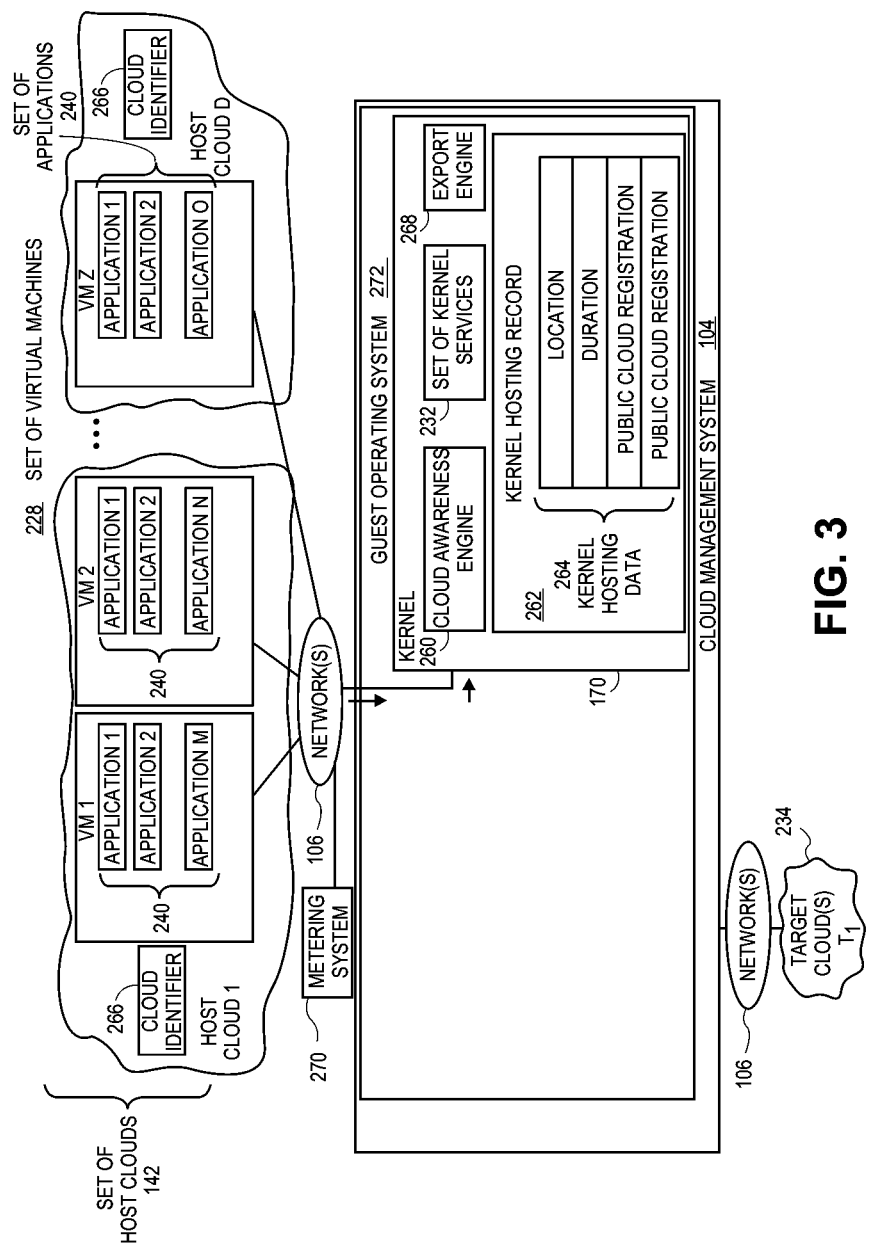
FIG. 3 illustrates a network configuration in which systems and methods for self-moving operating system installation in cloud-based network can be implemented, including kernel-based cloud awareness capabilities.

Consistent with the foregoing, in general, FIG. 3 shows an illustrative network configuration in which systems and methods for tracking cloud installation information using a cloud-aware operating system kernel can be implemented, according to various embodiments. In embodiments as shown, one or more users can operate a set of virtual machines 228 in a set of host clouds 142, for instance, by subscribing to resources in the set of host clouds 142 to support, provide, and/or execute the set of virtual machines 228 according to service level agreements (SLAs) and/or other terms or arrangements. In aspects, each virtual machine in the set of virtual machines 228 can have a set of applications 240 installed or instantiated in that machine, such as browsing, messaging, word processing, spreadsheet, and/or other applications or application types. According to aspects, each virtual machine in the set of virtual machines 228 can operate using an instance of a guest operating system 272 assigned to or supporting that machine in the associated cloud-based network in the set of host clouds 142. Each host cloud in the set of host clouds 142 can be supported, hosted, and/or executed in or by a cloud management system 104 associated with the set of host clouds 142. In aspects, the guest operating system 272 instantiated in one or more clouds in the set of host clouds can be or include, for instance, the Red Hat Enterprise Linux' operating system available from Red Hat, Inc., Raleigh, NC, or other operating systems or platforms. In aspects, the each instance of the guest operating system 272 can serve or function to support the operation of an associated virtual machine set of virtual machines 228 operating in the set of host clouds 142.

In aspects as shown, the kernel 170 of the guest operating system 272 can be configured or equipped with a set of services or resources including a set of kernel services 232 to support task scheduling, file support, and other operating system services for an associated virtual machine and/or other entities, as well as a cloud awareness engine 260 configured to perform discovery and tracking operations in the cloud environment in which the guest operating system 272 is installed. The cloud awareness engine 260 and/or other logic, application, platform, and/or service can be configured to build, access, update, and/or maintain a kernel hosting record 262 to directly capture and store information related to the location, duration, operation, and/or other details related to the use and activity of guest operating system 272 in one or more host clouds in the set of host clouds 142. The kernel hosting record 262 can be configured to store a set of kernel hosting data 264, including for instance cloud location information, operating system duration information reflecting the period or length of time over which the guest operating system 272 and/or associated virtual machines or applications have been executing and/or in use, public cloud registration information, private cloud registration information, and/or other data related to the operation of guest operating system 272 in the set of host clouds 142 or otherwise. In aspects as shown, the cloud awareness engine 260 can be integrated, hosted, and/or embedded directly in the kernel 170 of the guest operating system 272 itself, without a requirement for additional layers of software to perform cloud identification and operating system management tasks.

In terms of identifying the actual cloud or clouds in the set of host clouds 142 in which the guest operating system 272 is installed or operates, the cloud awareness engine 260 and/or other logic, application, platform, and/or service can be configured to communicate with one or more clouds in the set of host clouds 142 to interrogate those clouds for a respective cloud identifier 266. The cloud identifier 266 can be an identifier or code stored in or associated with each cloud in the set of host clouds 142 and/or other clouds, to identify the vendor, type, software compatibilities, subscription terms, resource capacities, and/or other data related to the cloud network environment supplied or offered by each cloud. In aspects, the cloud identifier 266 can represent a unique identifier or code assigned to all public clouds or other types of clouds, for instance, through a public registry maintained by one or more cloud vendors and/or other organizations. According to aspects, the cloud awareness engine 260 and/or other logic, application, platform, and/or service can request, interrogate, access, and/or otherwise acquire the cloud identifier 266 for the cloud in which it is installed, for instance by querying the cloud management system 104 associated with that cloud, and/or interrogating other entities, platforms, sources, and/or services. In implementations, the cloud awareness engine 260 and/or other logic, application, platform, and/or service can communicate with the cloud management system 104 and/or other entities via secure channels and/or private channels, such as encrypted channels or other connections.

In aspects, the cloud awareness engine 260 and/or other logic, application, platform, and/or service can likewise request or acquire other data directly or internally from the host cloud or cloud(s) in which it is installed or operates, including duration information as part of the set of kernel hosting data 264. The duration information can reflect the length, amount, and/or period of time over which the guest operating system 272, set of applications 240, set of virtual machines 228, and/or other operating systems, machines, and/or other entities have been installed, instantiated, and/or otherwise operating in the set of host clouds 142 using the guest operating system 272. The duration information can be stored by the cloud management system 104 and/or other logic or service associated with the host cloud or clouds in the set of host clouds 142 in which guest operating system 272 is installed and/or operates.

In aspects, the duration information can be associated with and/or used for purposes of metering and billing the end-user of one or more of the set of virtual machines 228 or other users, based on time of operating system use, resource consumption data, and/or other variables. In aspects, the cloud awareness engine 260 and/or other logic, application, platform, and/or service can be configured to access the kernel hosting record 262 and transmit duration information as well as other data in the set of kernel hosting data 264 to an external, third-party, and/or other metering system 270 for receipt and consumption by that system. In aspects, the metering system 270 can be configured to access subscription information for the subject user via subscription databases or other sources, to generate or process billing records or other subscription events or activities, based on the duration of operation of the guest operating system 272, set of virtual machines 228, set of applications 240, and/or other uses or factors. In aspects, the cloud awareness engine 260 and/or other logic, application, platform, and/or service can communicate with an entitlement engine 140 (FIG. 5) configured to record and administer subscription information for the set of host clouds, with that engine for instance installed in the cloud management system 104 and/or other host or location. The cloud awareness engine 260 can also be connected to metering system 270 via a secure channel or connection, if desired. The same or similar duration, subscription, and/or metering information can also be shared or stored to the cloud management system 104 of the corresponding host cloud, and/or to other locations.

Figure 4:
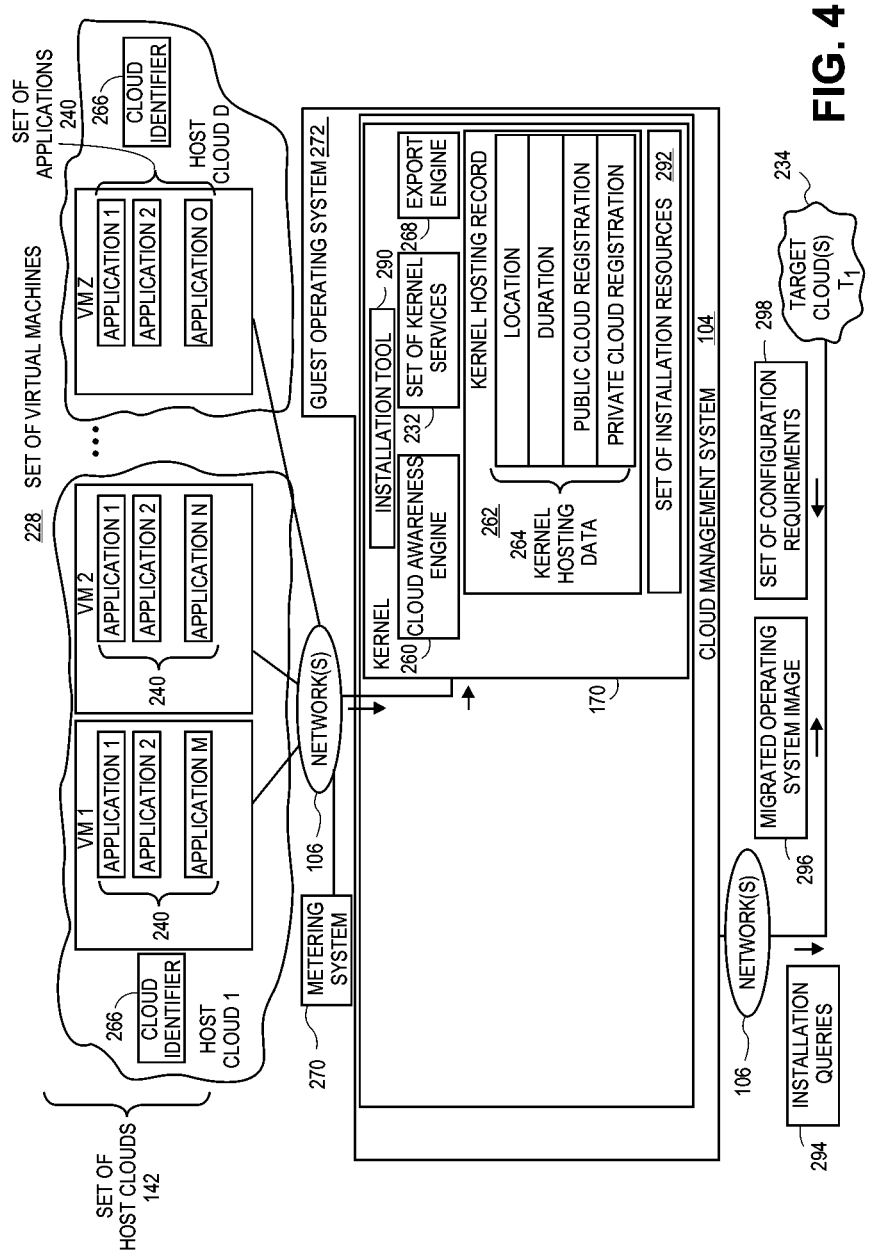
FIG. 4 illustrates a network configuration in which systems and methods for self-moving operating system installation in cloud-based network can be implemented, including kernel-based resource configuration and installation capabilities.

FIG. 4 illustrates an illustrative network configuration in which systems and methods for a self-moving operating system installation in a cloud-based network can be implemented, according to various embodiments including self-installation and/or migration capabilities. In embodiments as shown (and also as in FIG. 3), one or more users can operate a set of virtual machines 228 in a set of host clouds 142, for instance, by subscribing to resources in the set of host clouds 142 to support, provide, and/or execute the set of virtual machines 228 according to service level agreements (SLAs) and/or other terms or arrangements. In aspects, each virtual machine in the set of virtual machines 228 can have a set of applications 240 installed or instantiated in that machine, such as browsing, messaging, word processing, spreadsheet, and/or other applications or application types. According to aspects, each virtual machine in the set of virtual machines 228 can operate based on an instance of a guest operating system 272 supporting that machine in the set of host clouds 142. In aspects, the operating system 136 can likewise be or include, for instance, the Red Hat Enterprise Linux™ available from Red Hat, Inc., Raleigh, NC, or other operating systems or platforms. In aspects, the guest operating system 272 can serve or function as a host operating system to support the operation of the set of virtual machines 228 operating in the set of host clouds 142.

In aspects as shown, the kernel 170 can be configured or equipped with a set of services or resources including a set of kernel services 232 to support task scheduling, file support, and other operating system services, as well as an installation tool 290 to provide control logic for the potential installation, copying, and/or migration of the guest operating system 272 on an automated basis. The installation tool 290 and/or other logic, application, platform, and/or service can be configured to perform various discovery and/or interrogation operations to determine the necessary configuration parameters and/or other resources necessary to install, move, and/or copy the guest operating system 272 to one or more target clouds 234 and/or other destinations.

In aspects as shown, the installation tool 290 can receive an identification of one or more target clouds 234 to which the guest operating system 272 is to be installed, moved, and/or copied, for instance by user selection or input, and/or via automated services or applications. In aspects, the one or more target clouds 234 can be or include a new cloud host or hosts to which the guest operating system 272 and related resources will be installed, and/or can be or include additional cloud host(s) to which an image of the guest operating system 272 will be migrated or copied, for instance from an original host cloud in the set of host clouds 142.

In aspects, for those and other purposes, the installation tool 290 can be configured to generate, build, and/or configure a migrated operating system image 296 for purposes of installing, copying, and/or migrating the guest operating system 272 and/or adaptations thereof to the new or additional cloud host environments. In aspects, upon receiving or accessing an identification of the one or more target clouds 234 to which the migrated operating system image 296 will be installed, copied, and/or imaged, the installation tool 290 can identify the target cloud or clouds, and transmit a set of installation queries 294 to the target cloud or clouds. In aspects, the set of installation queries 294 can be or include commands, queries, and/or data requests for configuration parameters and/or resources necessary to install the migrated operating system image 296 to the intended cloud target(s).

In aspects, the one or more target clouds 234 can respond with a set of configuration requirements 298 indicating various parameters, configuration settings, and/or resources necessary to perform an installation of the migrated operating system image 296. The set of configuration requirements 298 can be, include, and/or specify data such as, for example the application programming interfaces (APIs) used, compatible with, or required by the one or more target clouds 234, and/or the file system or directory structures used by, compatible with, or required for storing files or other data in the one or more target clouds 234. The set of configuration requirements 298 can likewise be or include data such as a set of drivers used by, compatible with, or required by the one or more target clouds 234, such as for printing, storage, media sharing, and/or other services. Other configuration data and/or parameters can be specified in the set of configuration requirements 298 supplied by the one or more target clouds 234 responding to the set of installation queries 294 and/or other exchanges with or via the installation tool 290.

After receiving the set of configuration requirements 298 from the identified target host cloud or clouds in the set of target clouds 234, the installation tool 290 can access a set of installation resources 292 to build the migrated operating system image 296 that is compatible with the set of configuration requirements 298 for the one or more target clouds 234 to which the migration, installation, or movement of the operating system 136 is to take place. In aspects, the installation tool 290 can for instance extract APIs, drivers, file or directory structures, and/or other resources, services, applications, and/or data, and use that data to build the migrated operating system image 296.

In aspects, in some scenarios the installation tool 290 can build more than one migrated operating system image 296, for instance with different configurations, to transmit and install each migrated operating system image 296 in a different target cloud. In aspects, an administrator and/or other user may also choose to install or migrate images of the set of virtual machines 228, set of applications 240, and/or other virtual machine assets or resources, for instance using techniques for creating images of those entities as described herein. According to aspects, the administrator or other user can simply provide or specify an identification of the intended target cloud or clouds, and allow the installation tool 290 to detect the necessary resources or configurations for the migrated operating system image 296, without a need to manually insert or input those configurations or settings.

Figure 5:
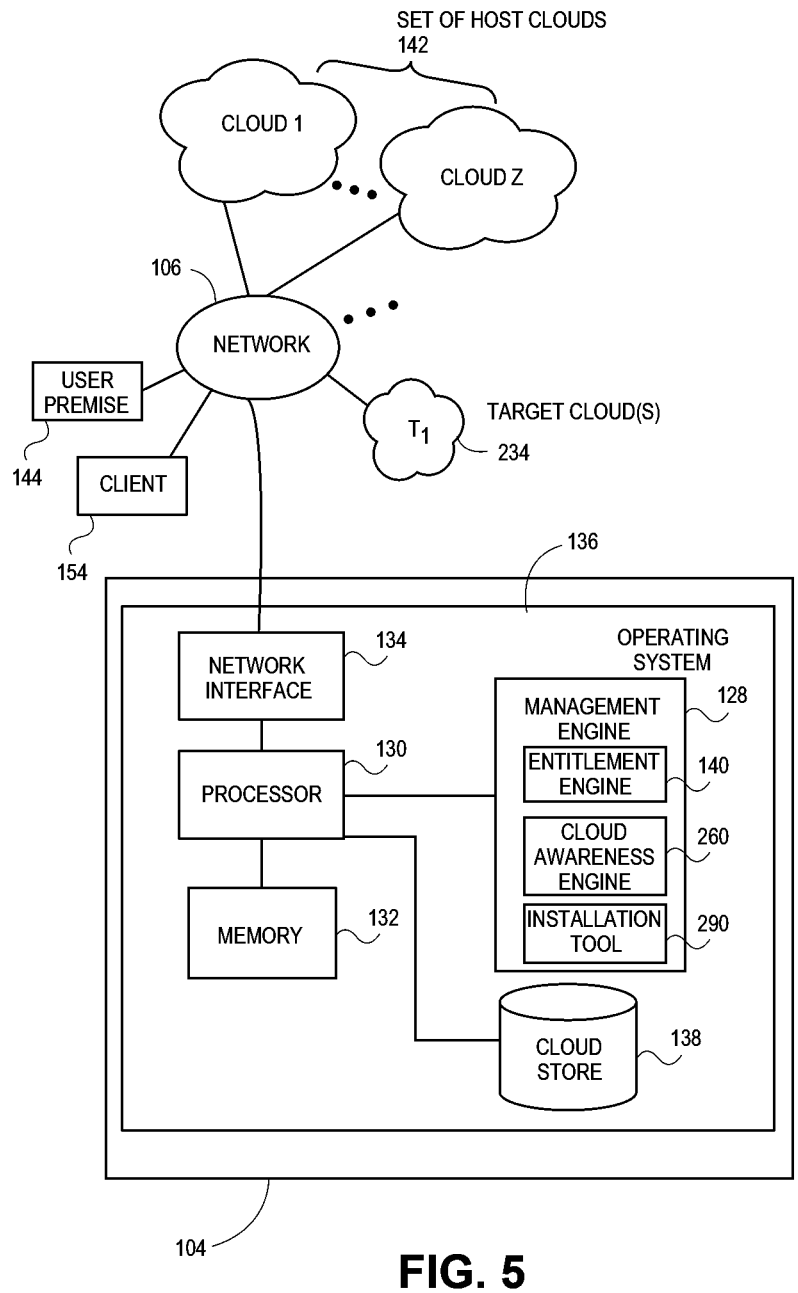
FIG. 5 illustrates an exemplary hardware configuration for a cloud management system and/or other hardware that can support and maintain one or more cloud-based networks, according to various embodiments.

FIG. 5 illustrates an exemplary diagram of hardware and other resources that can be incorporated in a cloud management system 104 configured to communicate with the set of instantiated virtual machines 116, entitlement engine 140, set of host clouds 142, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, a management engine 128, the installation tool 290, an entitlement engine 140, and cloud awareness engine 260 to execute control logic and control the operation of the set of virtual machines 228 and/or other resources in one or more clouds 102, the set of host clouds 142, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with other interfaces, applications, machines, sites, services, data, and/ or logic. Other configurations of the cloud management system 104, associated network connections, and other hardware, software, and service resources are possible. It may be noted that in embodiments, other hardware machines, platforms, or engines can comprise the same or similar resources as cloud management system 104, or can be configured with different hardware and software resources.

Figure 6:
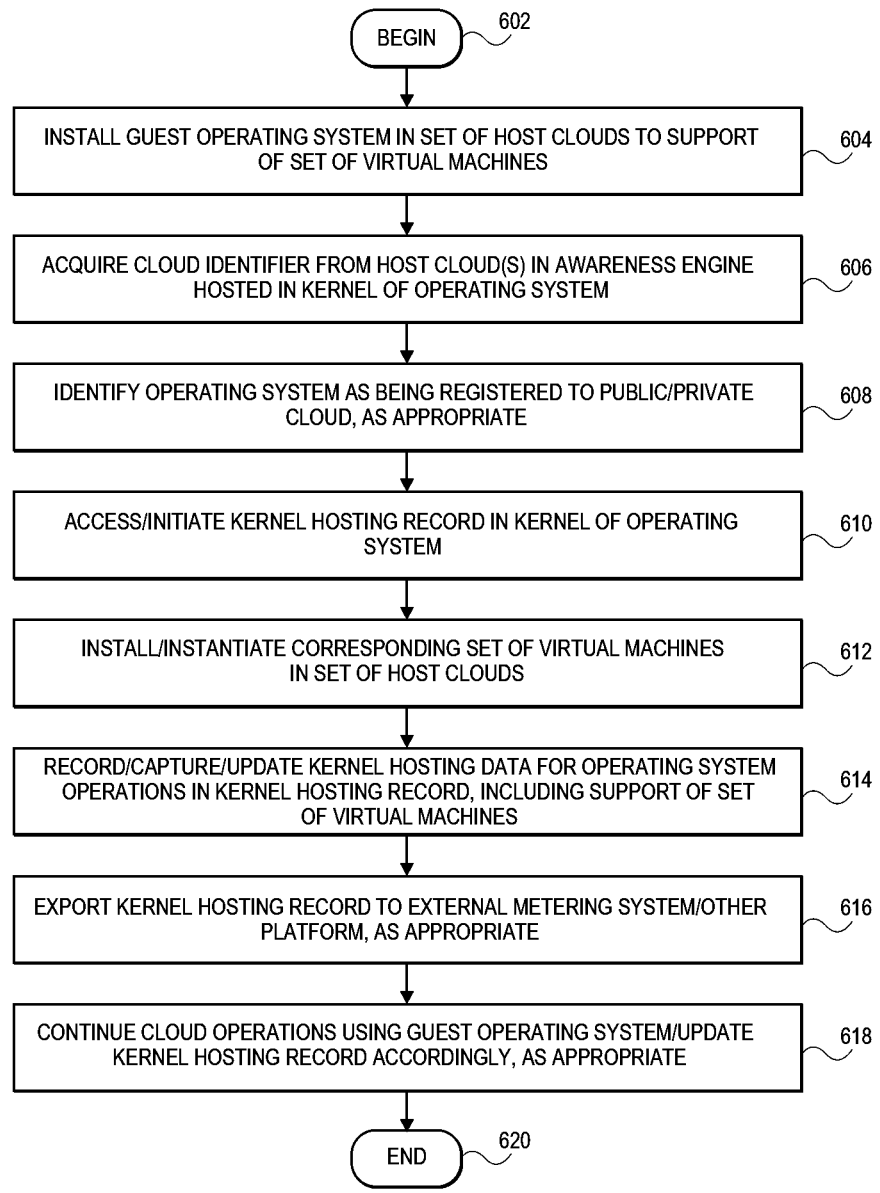
FIG. 6 illustrates a flowchart for the analysis and processing of cloud-related information capture at the kernel level of a cloud-based operating system, according to various embodiments.

FIG. 6 illustrates a flowchart of overall processing to perform various cloud-identification and other operations using kernel-based operating system resources, according to various embodiments of the present teachings. In 602, processing can begin. In 604, the guest operating system 272 can be installed or associated with one or more clouds in the set of host clouds 142, to support the operation of the set of virtual machines 228 operating or to be operated in that cloud or clouds.

In 606, the cloud identifier 266 for the cloud or clouds in which guest operating system 272 is installed or operating can be acquired in the cloud awareness engine 260 and/or other logic, application, platform, and/or service hosted in the kernel 170 of the guest operating system 272. In 608, the cloud awareness engine 260 and/or other logic, application, platform, and/or service can identify the guest operating system 272 as being installed or registered in a public cloud and/or a private cloud, as appropriate. In 610, the cloud awareness engine 260 and/or other logic, application, platform, and/or service can access and/or initiate the kernel hosting record 262 in the kernel 170 of the guest operating system 272, including the set of kernel hosting data 264.

In 612, the set of virtual machines 228 scan be installed and/or instantiated in the set of host clouds 142. In 614, the cloud awareness engine 260 and/or other logic, application, platform, and/or service can record, capture, and/or update the set of kernel hosting data 264 related to operation of the guest operating system 272, and/or related information, in the kernel hosting record 262. In aspects, the kernel hosting data 264 can including operations related to the support of the set of virtual machines 228, the set of applications 140, and/or other information or data.

In 616, the cloud awareness engine 260 and/or other logic, application, platform, and/or service can export or transmit the kernel hosting record 262 to a metering system 270, such as an external and/or other metering, billing, or administrative platform or service. In aspects, the kernel hosting record 262 can also or instead be transmitted to other applications or services, including potential third-party, internal, and/or external applications, services, and/or platforms for administrative, billing, or other purposes. In 618, cloud operations in the set of host clouds 142 can continue using the guest operating system 272, with updates to the kernel hosting record 262 accordingly being made, as appropriate. in 620, as understood by persons skilled in the art, processing can repeat, return to a prior processing point, jump to a further processing point, or end.

Figure 7:
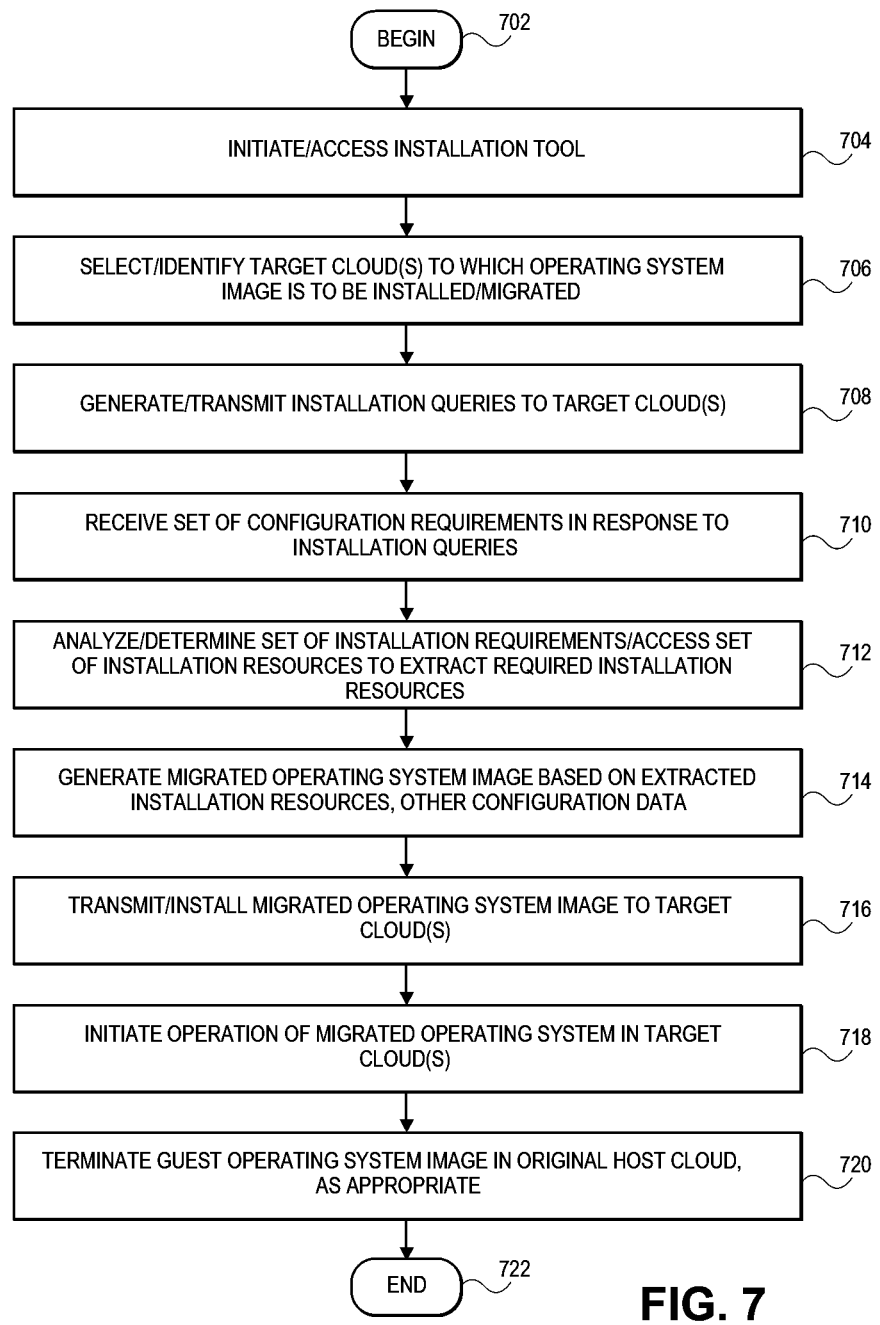
FIG. 7 illustrates a flowchart for the analysis and processing of configuration analysis and capture at the kernel level of a cloud-based operating system to prepare a migrated or installed image of that operating system, according to various embodiments.

FIG. 7 illustrates a flowchart of overall processing to perform various cloud-identification and configuration operations using kernel-based operating system resources to permit a self-migrating installation of a host operating system, according to various embodiments of the present teachings. In 702, processing can begin. In 704, an administrator and/or other user can access and/or initiate the installation tool 290, for instance, using a Web browser or other interface to communicate with a cloud management system 104 of an existing or potential new host cloud in the set of target clouds 234. In 706, the administrator and/or other user can select, identify, and/or specify one or more target clouds in the set of target clouds 234 to which the migrated operating system image 296 of the guest operating system 272 can be installed, moved, and/or copied. In 708, the installation tool 290 can generate and/or transmit a set of installation queries 294 to the selected target cloud or clouds.

In 710, the installation tool 290 can receive a set of configuration requirements 298 in response to the set of installation queries 294 from one or more target clouds in the set of target clouds 234. In aspects, the set of configuration requirements 298 can indicated, encode, and/or specify configuration or resource specifications or details required by, and/or compatible with, installation and operation of the migrated operating system image 296 in each respective target cloud environment, as a potential recipient and host for the migrated operating system image 296. Those required resources or configuration settings can include, merely for example, different types of application programming interfaces (APIs), drivers, file systems, directory systems, and/or other settings or specifications.

In 712, the installation tool 290 can analyze and/or determine the set of configuration requirements 298, and can access the set of installation resources 292 to access and/or extract one or more required installation resources. In aspects, the set of installation resources 292 can be stored or encoded directly in kernel 170 itself, and/or can be linked or accessed to external services and/or databases. In 714, the installation tool 290 can generate the migrated operating system image 296 based on the extracted installation resources, and/or other configuration data. In 716, the installation tool 290 can transmit and/or install the migrated operating system image 296 to the selected one or more target clouds in the set of target clouds 234.

In 718, the selected target cloud or clouds which have received the migrated operating system image 296 can initiate operation of the migrated operating system image 296 in that respective cloud or clouds. In 720, the installation tool 290 can terminate the image of guest operating system 272 in the original or source host cloud, as appropriate. The installation tool 290 can generate an updated migrated operating system image 296 based on changes to the set of configuration requirements 298 in one or more clouds in the set of target clouds 234 to which the migrated operating system image 296 has been transferred and instantiated. In 722, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
identifying, by a guest operating system (OS), a host cloud in which the guest OS operates to manage a plurality of virtualized systems in the host cloud;
instantiating, by the guest OS, a plurality of applications at the plurality of virtualized systems in the host cloud, wherein a first application of the plurality of applications is instantiated at one or more first virtualized systems of the plurality of virtualized systems, the one or more first virtualized systems running using a first set of resources;
transmitting, by the guest OS, a request to the first set of resources for information comprising resource usage duration information and resource consumption data related to performance of the first application of the plurality of applications;
responsive to receiving the requested information from the first set of resources, updating a record associated with the guest OS based on the received requested information;
determining, by the guest OS and based on the record, that one or more performance criteria for the plurality of virtualized systems are not satisfied;
identifying, by the guest OS, a second set of resources to satisfy the one or more performance criteria;
configuring, by the guest OS, at least one of the plurality of virtualized systems to operate in the host cloud to satisfy the one or more performance criteria by substituting the second set of resources for at least a portion of the first set of resources;
generating, by the guest OS, a first operating system image comprising the first application, wherein the first operating system image is configured based on the record associated with the guest OS; and
causing, by the guest OS, the first application to be instantiated on a first target cloud using the first operating system image.

2. The method of claim 1, wherein, prior to causing the first application to be instantiated on the first target cloud using the first operating system image, the method comprises:
identifying, by the guest OS, the first target cloud.

3. The method of claim 1, further comprising:
identifying, by the guest OS, a second target cloud;
generating, by the guest OS, a second operating system image comprising a second application of the plurality of applications; and
causing, by the guest OS, the second application to be instantiated on the second target cloud using the second operating system image.

4. The method of claim 3, further comprising:
receiving, by the guest OS, information related to the second application; and
updating, by the guest OS, data related to operation of the guest operating system using the information related to the second application.

5. The method of claim 1, wherein the host cloud is included in a plurality of host clouds, and wherein identifying the host cloud in which the guest operating system operates comprises:
sending, by the guest OS to each host cloud of the plurality of host clouds, a request for an identifier for a corresponding host cloud; and
receiving, by the guest OS, a set of identifiers each associated with a corresponding host cloud of the plurality of host clouds, wherein the host cloud in which the guest operating system operates is identified in view of the received set of identifiers.

6. A system comprising:
a memory; and
a processor coupled to the memory, the processor to:
identify, by a guest operating system (OS), a host cloud in which the guest OS operates to manage a plurality of virtualized systems in the host cloud;
instantiate, by the guest OS, a plurality of applications at the plurality of virtualized systems in the host cloud, wherein a first application of the plurality of applications is instantiated at one or more first virtualized systems of the plurality of virtualized systems, the one or more first virtualized systems running using a first set of resources;
transmit, by the guest OS, a request to the first set of resources for information comprising resource usage duration information and resource consumption data related to performance of the first application of the plurality of applications;
responsive to receiving the requested information from the first set of resources, update a record associated with the guest OS based on the received requested information from the first set of resources;
determine, by the guest OS and based on the updated record, that one or more performance criteria for the plurality of virtualized systems are not satisfied;
identify, by the guest OS, a second set of resources to satisfy the one or more performance criteria;
configure, by the guest OS, at least one of the plurality of virtualized systems to operate in the host cloud to satisfy the one or more performance criteria by substituting the second set of resources for at least a portion of the first set of resources;
generate, by the guest OS, a first operating system image comprising the first application, wherein the first operating system image is configured based on the record associated with the guest OS; and
cause, by the guest OS, the first application to be instantiated on a first target cloud using the first operating system image.

7. The system of claim 6, wherein, prior to causing the first application to be instantiated on the first target cloud using the first operating system image, the processor is to:
identify, by the guest OS, the first target cloud.

8. The system of claim 6, wherein the processor is further to:
identify, by the guest OS, a second target cloud;
generate, by the guest OS, a second operating system image comprising a second application of the plurality of applications; and
cause, by the guest OS, the second application to be instantiated on the second target cloud using the second operating system image.

9. The system of claim 8, wherein the processor is further to:

receive, by the guest OS, information related to the second application; and update, by the guest OS, data related to operation of the guest operating system using the information related to the second application.

10. A non-transitory machine-readable storage medium including instructions that, when accessed by a processor, cause the processor to:

identify, by a guest operating system (OS), a host cloud in which the guest OS operates to manage a plurality of virtualized systems in the host cloud using a first set of resources;

instantiate, by the guest OS, a plurality of applications at the plurality of virtualized systems in the host cloud, wherein a first application of the plurality of applications is instantiated at one or more first virtualized systems of the plurality of virtualized systems, the one or more first virtualized systems running using a first set of resources;

transmit, by the guest OS, a request to the first set of resources for information comprising resource usage duration information and resource consumption data related to performance of the first application of the plurality of applications;

responsive to receiving the requested information from the first set of resources, update a record associated with the guest OS based on the received requested information;

determine, by the guest OS and based on the updated record, that one or more performance criteria for the plurality of virtualized systems are not satisfied;

identify, by the guest OS, a second set of resources to satisfy the one or more performance criteria;

configure, by the guest OS, at least one of the plurality of virtualized systems to operate in the host cloud to satisfy the one or more performance criteria by substituting the second set of resources for at least a portion of the first set of resources;

generate, by the guest OS, a first operating system image comprising the first application, wherein the first operating system image is configured based on the record associated with the guest OS; and cause, by the guest OS, the first application to be instantiated on a first target cloud using the first operating system image.

11. The non-transitory machine-readable storage medium of claim 10, wherein, prior to causing the first application to be instantiated on the first target cloud using the first operating system image, the processor is to:

identify, by the guest OS, the first target cloud.

12. The non-transitory machine-readable storage medium of claim 10, wherein the processor is further to:

identify, by the guest OS, a second target cloud;

generate, by the guest OS, a second operating system image of a second application of the plurality of applications; and cause, by the guest OS, the second application to be instantiated on the second target cloud using the second operating system image.

13. The non-transitory machine-readable storage medium of claim 12, wherein the processor is further to:

receive, by the guest OS, information related to the second application; and update, by the guest OS, data related to operation of the guest operating system using the information related to the second application.

14. The method of claim 1, wherein the one or more performance criteria for the plurality of virtualized systems comprise one or more performance thresholds associated with a performance condition for the plurality of virtualized systems.

15. The non-transitory machine-readable storage medium of claim 10, wherein the first set of resources comprises one or more first resource servers and the second set of resources comprises one or more second resource servers.

16. The method of claim 1, wherein the record further comprises one or more of public cloud registration information pertaining to the guest OS or private cloud registration information pertaining to the guest OS.

17. The system of claim 6, wherein the record further comprises one or more of public cloud registration information pertaining to the guest OS or private cloud registration information pertaining to the guest OS.

18. The non-transitory machine-readable storage medium of claim 10, wherein the record further comprises one or more of public cloud registration information pertaining to the guest OS or private cloud registration information pertaining to the guest OS.

19. The method of claim 1, wherein the second set of resources comprises a particular type of resource different than any type of resource included in the first set of resources.

20. The method of claim 19, wherein the first operating system image is configured to cause instantiation of the first application using resources from the first target cloud that are of the particular type of resource.

* * * * *